(12) United States Patent
Wang et al.

(10) Patent No.: US 7,718,737 B2
(45) Date of Patent: May 18, 2010

(54) RUBBER COMPOSITION CONTAINING FUNCTIONALIZED POLYMER NANOPARTICLES

(75) Inventors: Xiaorong Wang, Hudson, OH (US); James E. Hall, Mogadore, OH (US); Georg G. A. Böhm, Akron, OH (US); Chenchy Jeffrey Lin, Hudson, OH (US)

(73) Assignee: Bridgestone Corporation (JP)

( * ) Notice: Subject to any disclaimer, the term of this patent is extended or adjusted under 35 U.S.C. 154(b) by 681 days.

(21) Appl. No.: 10/791,177

(22) Filed: Mar. 2, 2004

(65) Prior Publication Data
US 2009/0156757 A1 Jun. 18, 2009

(51) Int. Cl.
C08F 279/00 (2006.01)
(52) U.S. Cl. .................... 525/313; 525/314; 525/332.2; 525/332.9
(58) Field of Classification Search .................. 525/313, 525/314, 332.2, 332.9
See application file for complete search history.

(56) References Cited

U.S. PATENT DOCUMENTS

| | | |
|---|---|---|
| 2,531,396 A | 11/1950 | Carter et al. |
| 3,598,884 A | 8/1971 | Wei |
| 3,793,402 A | 2/1974 | Owens |
| 3,840,620 A | 10/1974 | Gallagher |
| 3,972,963 A | 8/1976 | Schwab et al. |
| 4,233,409 A | 11/1980 | Bulkley |
| 4,247,434 A | 1/1981 | Lovelace et al. |
| 4,248,986 A | 2/1981 | Lal et al. |
| 4,326,008 A | 4/1982 | Rembaum |
| 4,386,125 A | 5/1983 | Shiraki et al. |
| 4,463,129 A | 7/1984 | Shinada et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fulwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 5,036,138 A | 7/1991 | Stamhuis et al. |
| 5,066,729 A | 11/1991 | Stayer, Jr. et al. |
| 5,073,498 A | 12/1991 | Schwartz et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |

(Continued)

FOREIGN PATENT DOCUMENTS

CA 2127919 3/1995

(Continued)

OTHER PUBLICATIONS

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

(Continued)

Primary Examiner—Robert D. Harlan
(74) Attorney, Agent, or Firm—Meredith E. Hooker; Nathan Lewis

(57) ABSTRACT

A polymer nanoparticle is provided. The nanoparticle includes an inner layer having alkenylbenzene monomer units. The nanoparticle further includes an outer layer having monomer units selected from conjugated dienes, alkylenes, alkenylbenzenes, and mixtures thereof. The nanoparticle has at least one functional group associated with the outer layer. Applications of use as additives for rubber, including the rubber compositions, are also provided.

25 Claims, 4 Drawing Sheets

U.S. PATENT DOCUMENTS

| | | |
|---|---|---|
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter |
| 6,437,050 B1 * | 8/2002 | Krom et al. ............... 525/313 |
| 6,441,090 B1 | 8/2002 | Demirors et al. |
| 6,448,353 B1 | 9/2002 | Nelson et al. |
| 6,489,378 B1 | 12/2002 | Sosa |
| 6,524,525 B2 | 2/2003 | Hauner et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 * | 3/2005 | Wang et al. ............... 525/313 |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 * | 7/2007 | Wang et al. ............... 525/313 |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heimrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang |
| 2003/0130401 A1 | 7/2003 | Lin et al. |
| 2003/0149185 A1 | 8/2003 | Wang |
| 2003/0198810 A1 | 10/2003 | Wang |
| 2003/0225190 A1 | 12/2003 | Borbely |
| 2004/0033345 A1 | 2/2004 | Dubertret et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0182158 A1 | 8/2005 | Ziser et al. |
| 2005/0192408 A1 | 9/2005 | Wang et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0228072 A1 | 10/2005 | Winkler et al. |
| 2005/0228074 A1 | 10/2005 | Wang et al. |
| 2005/0282956 A1 | 12/2005 | Bohm et al. |
| 2006/0084722 A1 | 4/2006 | Lin et al. |
| 2006/0173115 A1 | 8/2006 | Wang et al. |
| 2006/0173130 A1 | 8/2006 | Wang et al. |
| 2006/0235128 A1 | 10/2006 | Bohm et al. |
| 2007/0027264 A1 | 2/2007 | Wang et al. |

| | | | |
|---|---|---|---|
| 2007/0135579 | A1 | 6/2007 | Obrecht et al. |
| 2007/0142550 | A1 | 6/2007 | Scurati et al. |
| 2007/0142559 | A1 | 6/2007 | Wang et al. |
| 2007/0149649 | A1 | 6/2007 | Wang et al. |
| 2007/0161754 | A1 | 7/2007 | Wang et al. |
| 2007/0185273 | A1 | 8/2007 | Wang et al. |
| 2007/0196653 | A1 | 8/2007 | Hall et al. |
| 2008/0145660 | A1 | 6/2008 | Wang et al. |
| 2008/0149238 | A1 | 6/2008 | Kleckner et al. |
| 2008/0160305 | A1 | 7/2008 | Wang et al. |
| 2008/0286374 | A1 | 11/2008 | Wang et al. |
| 2008/0305336 | A1 | 12/2008 | Wang et al. |
| 2009/0005491 | A1 | 1/2009 | Warren et al. |
| 2009/0048390 | A1 | 2/2009 | Wang et al. |

FOREIGN PATENT DOCUMENTS

| | | |
|---|---|---|
| DE | 3434983 | 4/1986 |
| DE | 4241538 | 6/1994 |
| EP | 143500 | 6/1985 |
| EP | 0255170 | 2/1988 |
| EP | 0 265 142 A2 | 4/1988 |
| EP | 265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0 590 491 A2 | 4/1994 |
| EP | 0742268 | 11/1996 |
| EP | 1031605 | 8/2000 |
| EP | 1 099 728 A1 | 5/2001 |
| EP | 1 134 251 A1 | 9/2001 |
| EP | 1273616 | 1/2003 |
| EP | 1321489 | 6/2003 |
| EP | 1783168 | 5/2007 |
| FR | 2099645 | 3/1972 |
| JP | 01279943 | 1/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08-199062 | 8/1996 |
| JP | 2000-514791 | 11/2000 |
| JP | 2003-0095640 | 4/2003 |
| JP | 2006-072283 | 3/2006 |
| JP | 2006-106596 | 4/2006 |
| JP | 2007-304409 | 11/2007 |
| WO | WO 91/04992 | 4/1991 |
| WO | 9704029 | 2/1997 |
| WO | 9853000 | 11/1998 |
| WO | 0075226 | 12/2000 |
| WO | WO 01/87999 A2 | 11/2001 |
| WO | WO 02/31002 A1 | 4/2002 |
| WO | WO 02/081233 A1 | 10/2002 |
| WO | WO 02/100936 | 12/2002 |
| WO | 03032061 | 4/2003 |
| WO | WO 03/085040 A2 | 10/2003 |
| WO | WO2004/058874 | 7/2004 |
| WO | 2006-069793 | 7/2006 |
| WO | 2008/079276 | 7/2008 |
| WO | 2008/079807 | 7/2008 |
| WO | 2009/006434 | 1/2009 |

OTHER PUBLICATIONS

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746 (1977).

Association of Block Copolymers in Selective Solvents, 1 Measurements on Hydrogenated Poly(styrene-isoprene) in Decane and in trans-Decalin, Mandema et al., Makromol. Chem. 180, 1521-1538 (1979).

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Eamshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

R.P. Quirk and S.C. Galvan, Macromolecules, 34, 1192-1197 (2001).

M. Moller, J.P. Spaz, A. Roescher, S. Mobmer, S.T. Selvan, H.A. Klok, Macromol. Symp. 117, 207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Functionalized Core Shell Polymers Prepared by Microemulsion Polymerization,E. Mendizabal. J.E. Pugl, A. Aguiar, S. Gonzalez-Villegas, 477/Antec '97/1733-1737.

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sept. 21, 2000, pp. 8836-8840, Dept. of Chemistry, Science Laboratories, Durham University. Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

An article entitled "Dendritic Macromolecules: Synthesis of Starburst Dendrimers" Donald A. Tomalia et al., Macromolecules, vol. 19, No. 9, 1986, contribution from Functional Polymers/Processes and the Analytical Laboratory, Dow Chemical, Midland, MI 48640, pp. 2466-2468.

An article entitled "Preparation and Characterization of Heterophase Blends of Polycaprolactam and Hydrogenated Polydienes" David F. Lawson, et al. pp. 2331-2351, Central Research Labs., The Firestone Tire and Rubber Co., Akron, Ohio 44317, Journal of Applied Polymer Science, vol. 39, 1990 John Wiley & Sons, Inc.

Kirk-Othmer, Encyclopedia of Chemical Technology, 3rd Ed., Wiley Interscience, NY, 1982, vol. 22, "Vulcanization Agents and Auxiliary Materials", pp. 390-402.

Bahadur, Pratap, "Block copolymers- Their microdomain formation (in solid state) and surfactant behaviour (in solution)", Current Science, vol. 80, No. 8, pp. 1002-1007, Apr. 25, 2001.

Guo, Andrew et al., "Star Polymers and Nanospheres from Cross-Linkable Diblock Copolymers", Macromolecules, vol. 29, pp. 2487-2493, Jan. 17, 1996.

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Oranli, Levent et al., "Hydrodynamic studies on micellar solutions of styrene-butadiene block copolymers in selective solvents", Can. J. Chem, vol. 63, pp. 2691-2696, 1985.

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Thurmond, K. Bruce et al., "Shell cross-linked polymer micelles: stabilized assemblies with great versatility and potential", Colloids and Surfaces B: Biointerfaces, vol. 16, pp. 45-54, 1999.

Wilson, D.J. et al., "Photochemical Stabilization of Block Copolymer Micelles", Eur. Polym. J., vol. 24, No. 7, pp. 617-621, 1988.

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Kralik, M. et al., "Catalysis by metal nanoparticles supported on functional organic polymers", Journal of Molecular Catalysis A: Chemical, vol. 177, pp. 113-138 [2001].

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Wang, Xiaorong et al., U.S. Appl. No. 10/791,049, filed Mar. 2, 2004 entitled "Method Of Making Nano-Particles Of Selected Size Distribution".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al. U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation And Applications".

Wang, Xiaorong et al., U.S. Appl. No. 11/104,759, filed Apr. 13, 2005 entitled "Nano-Particle Preparation And Applications".

Bohm, Georg G.A. et al., U.S. Appl. No. 11/117,981, filed Apr. 29, 2005 entitled "Self Assembly Of Molecules To Form Nano-Particle".

Wang, Xiaorong et al., U.S. Appl. No. 11/305,279, filed Dec. 16, 2005 entitled "Combined Use Of Liquid Polymer And Polymeric Nanoparticles For Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796, filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Bohm, Georg et al., "Emerging materials: technology for new tires and other rubber products", Tire Technology International, 2006 (4 pp.).

Cui, Honggang et al., "Block Copolymer Assembly via Kinetic Control", Science, vol. 317, pp. 647-650 (Aug. 3, 2007).

Edmonds, William F. et al., "Disk Micelles from Nonionic Coil-Coil Diblock Copolymers", Macromolecules, vol. 39, pp. 4526-4530 (May 28, 2006).

O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Synthesis, Characterization, and Application of Novel Polymeric Nanoparticles", Macromolecules, 40, pp. 499-508 (2007).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Heterogeneity of structural relaxation in a particle-suspension system", EPL, 79, 18001, pp. 1-5 (Jul. 2007).

Bridgestone Americas 2006 Presentation (14 pp.).

Cain, Edward J., Final Office Action dated Dec. 9, 2008 from U.S. Appl. No. 11/642,795 (6 pp.).

Mulcahy, Peter D., Restriction/Election Office Action dated Dec. 11, 2008 from U.S. Appl. No. 11/642,802 (7 pp.).

Lipman, Bernard, Notice of Allowance dated Jan. 14, 2009 from U.S. Appl. No. 11/058,156 (5 pp.).

Harlan, Robert D., Office Action dated Jan. 9, 2009 from U.S. Appl. No. 11/117,981 (6 pp.).

Cain, Edward J., Notice of Allowance dated Dec. 31, 2008 from U.S. Appl. No. 11/642,124 (5 pp.).

Lipman, Bernard, Mar. 26, 2002 Notice of Allowance from U.S. Appl. No. 09/970,830, filed Oct. 4, 2001 (4 pp.).

Kiliman, Leszek B., Feb. 13, 2003 Office from U.S. Appl. No. 10/038,748, filed Dec. 31, 2001 (3 pp.).

Kiliman, Leszak B., Aug. 25, 2003 Notice of Allowance from U.S. Appl. No. 10/038,748, filed Dec. 31, 2001 (5 pp.).

Harlan, Robert D., Mar. 17, 2004 Restriction/Election Office Action from U.S. Appl. No. 10/223,393, filed Aug. 19, 2002 (6 pp.).

Harlan, Robert D., Jun. 22, 2004 Office Action from U.S. Appl. No. 10/223,393, filed Aug. 19, 2002 (6 pp.).

Harlan, Robert D., Jan. 3, 2005 Notice of Allowance from U.S. Appl. No. 10/223,393, filed Aug. 19, 2002 (6 pp.).

Lipman, Bernard, Mar. 25, 2004 Restriction/Election Office Action from U.S. Appl. No. 10/331,841, filed Dec. 30, 2002 (6 pp.).

Lipman, Bernard, Nov. 18, 2004 Notice of Allowance from U.S. Appl. No. 10/331,841, filed Dec. 30, 2002 (5 pp.).

Lipman, Bernard, Mar. 24, 2004 Restriction/Election Office Action from U.S. Appl. No. 10/345,498, filed Jan. 16, 2003 (5 pp.).

Lipman, Bernard, Nov. 23, 2004 Notice of Allowance from U.S. Appl. No. 10/345,498, filed Jan. 16, 2003 (5 pp.).

Choi, Ling Siu, Mar. 24, 2006 Office Action from U.S. Appl. No. 10/755,648, filed Jan. 12, 2004 (11 pp.).

Choi, Ling Siu, Dec. 4, 2006 Notice of Allowance from U.S. Appl. No. 10/755,648, filed Jan. 12, 2004 (9 pp.).

Asinovsky, Olga, Aug. 16, 2007 Advisory Action from U.S. Appl. No. 10/791,049, filed Mar. 2, 2004 (2 pp.).

Asinovsky, Olga, Jul. 29, 2008 Advisory Action from U.S. Appl. No. 10/791,049, filed Mar. 2, 2004 (3 pp.).

Le, Hoa T., Dec. 14, 2004 Office Action from U.S. Appl. No. 10/791,491, filed Mar. 2, 2004 (5 pp.).

Le, Hoa T., Jul. 5, 2005 Office Action from U.S. Appl. No. 10/791,491, filed Mar. 2, 2004 (9 pp.).

Le, Hoa T., Apr. 10, 2006 Notice of Allowance from U.S. Appl. No. 10/791,491, filed Mar. 2, 2004 (5 pp.).

Kiliman, Leszak B., May 15, 2007 Advisory Action from U.S. Appl. No. 10/817,995, filed Apr. 5, 2004 (2 pp.).
Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action from U.S. Appl. No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 International Search Report from PCT Patent Application No. PCT/US2004/001000 filed Jan. 15, 2004 (3 pp.).
Russell, G., Aug. 1, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/026031 filed Dec. 19, 2007 (3 pp.).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).
Batzilla, Thomas et al., "Formation of intra- and intermolecular crosslinks in the radical crosslinking of poly(4-vinylstyrene)", Makromol. Chem., Rapid Commun. 8, pp. 261-268 (1987).
Bauer, B.J. et al., "Synthesis and Dilute-Solution Behavior of Model Star-Branched Polymers", Rubber Chemistry and Technology, vol. 51, pp. 406-436 (1978).
Berger, G. et al., "Mutual Termination of Anionic and Cationic 'Living' Polymers", Polymer Letters, vol. 4, pp. 183-186 (1966).

Bradley, John S., "The Chemistry of Transition Metal Colloids", Clusters and Colloids: From Theory to Applications, Chapter 6, Weinheim, VCH, pp. 459-544 (1994).
Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).
Borukhov, Itamar et al., "Enthalpic Stabilization of Brush-Coated Particles in a Polymer Melt", Macromolecules, vol. 35, pp. 5171-5182 (2002).
Braun, Hartmut et al., "Enthalpic interaction of diblock copolymers with immiscible polymer blend components", Polymer Bulletin, vol. 32, pp. 241-248 (1994).
Brown, H.R. et al., "Communications to the Editor: Enthalpy-Driven Swelling of a Polymer Brush", Macromolecules, vol. 23, pp. 3383-3385 (1990).
Calm, John W., "Phase Separation by Spinodal Decomposition in Isotropic Systems", The Journal of Chemical Physics, vol. 42, No. 1, pp. 93-99 (Jan. 1, 1965).
Calderara, Frederic et al., "Synthesis of chromophore-labelled polystyrene/poly(ethylene oxide) diblock copolymers", Makromol. Chem., 194, pp. 1411-1420 (1993).
Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).
Chen, Ming-Qing et al., "Nanosphere Formation in Copolymerization of Methyl Methacrylate with Poly (ethylene glycol) Macromonomers", Journal of Polymer Science: Part A: Polymer Chemistry, vol. 38, pp. 1811-1817 (2000).
Ege, Seyhan, Organic Chemistry Structure and Reactivity, 3rd Edition, p. 959 (1994).
Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).
Erhardt, Rainer et al., Macromolecules, vol. 34, No. 4, pp. 1069-1075 (2001).
Eschwey, Helmut et al., "Preparation and Some Properties of Star-Shaped Polymers with more than Hundred Side Chains", Die Makromolekulare Chemie 173, pp. 235-239 (1973).
Eschwey, Helmut et al., "Star polymers from styrene and divinylbenzene", Polymer, vol. 16, pp. 180-184 (Mar. 1975).
Fendler, Janos H., "Nanoparticles and Nanostructured Films: Preparation, Characterization and Applications", Wiley-VCH, pp. 1-468 (1998).
Ferreira, Paula G. et al., "Scaling Law for Entropic Effects at Interfaces between Grafted Layers and Polymer Melts", Macromolecules, vol. 31, pp. 3994-4003 (1998).
Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).
Gay, C., "Wetting of a Polymer Brush by a Chemically Identical Polymer Melt", Macromolecules, vol. 30, pp. 5939-5943 (1997).
Halperin, A., "Polymeric Micelles: A Star Model", Macromolecules, vol. 20, pp. 2943-2946 (1987).
Hamley, Ian W., "The Physics of Block Copolymers", Oxford Science Publication: Oxford, Chapters 3 and 4, pp. 131-265, (1998).
Hasegawa, Ryuichi et al., "Optimum Graft Density for Dispersing Particles in Polymer Melts", Macromolecules, vol. 29, pp. 6656-6662 (1996).
Ishizu, Koji et al., "Synthesis of Star Polymer with Nucleus of Microgel", Polymer Journal, vol. 12, No. 6, pp. 399-404 (1980).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Kraus, Gerard, "Mechanical Losses in Carbon-Black-Filled Rubbers", Journal of Applied Polymer Science: Applied Polymer Symposium, vol. 39, pp. 75-92 (1984).
Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Matsen, M.W., "Phase Behavior of Block Copolymer/Homopolymer Blends", Macromolecules, vol. 28, pp. 5765-5773 (1995).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Nace, Vaughn M., "Nonionic Surfactants: Polyoxyalkylene Block Copolymers", Surfactant Science Series, vol. 60, pp. 1-266 (1996).

Noolandi, Jaan et al., "Theory of Block Copolymer Micelles in Solution", Macromolecules, vol. 16, pp. 1443-1448 (1983).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Piirma, Irja, "Polymeric Surfactants", Surfactant Science Series, vol. 42, pp. 1-289 (1992).

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Saito, Reiko et al., "Synthesis of Microspheres with Microphase-Separated Shells", Journal of Polymer Science: Part A: Polymer Chemistry, vol. 38, pp. 2091-2097 (2000).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337(1998).

van der Maarel, J.R.C. et al., "Salt-Induced Contraction of Polyelectrolyte Diblock Copolymer Micelles", Langmuir, vol. 16, No. 19, pp. 7510-7519 (2000).

Webber, Stephen E. et al., "Solvents and Self-Organization of Polymers", NATO ASI Series, Series E: Applied Sciences, vol. 327, pp. 1-509 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Wooley, Karen L., "From Dendrimers to Knedel-like Structures", Chem. Eur. J., 3, No. 9, pp. 1397-1399 (1997).

Wooley, Karen L., "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Worsfold, D.J., "Anionic Copolymerization of Styrene With p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Lipman, Bernard, Jan. 27, 2009 Notice of Allowance from U.S. Appl. No. 11/764,607 (4 pp.).

Johnson, Edward M., International Search Report dated Dec. 12, 2008 from PCT Application No. PCT/US07/74611 (5 pp.).

Wang, Xiaorong et al., U.S. Appl. No. 12/374,883 international filing date Jul. 27, 2007, entitled "Polymeric Core-Shell Nanoparticles with Interphase Region".

Reaction of Primary Aliphatic Amines with Maleic Anhydride, Lester E. Coleman et al., J. Org,. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Dialkylimidazolium Chloroaluminate Melts: A New Class of Room-Temperature Ionic Liquids for Electrochemistry, Spectroscopy, and Synthesis. J.S. Wilkes, J.A. Levisky, B.A. Wilson, Inorg. Chem. 1982, 21, pp. 1263-1264.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, Jan. 1, 1996, pp. 29-35.

A Review of Nanocomposites 2000, J.N. Hay, S. J. Shaw.

Recent Advances in Flame Retardant Polymer Nanocomposites, Tilman, J.W. et al., pp. 273-283.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Warren, Sandra, U.S. Appl. No. 11/771,659, filed Jun. 29, 2007 entitled "One-Pot Synthesis Of Nanoparticles And Liquid Polymer For Rubber Applications".

Wang, Xiaorong et al., U.S. Appl. No. 11/941,128, filed Nov. 16, 2007 entitled "Nano-Particle Preparation And Applications".

Sakurai, Ryo et al., "68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049, filed Mar. 2, 2004 (11 pp.).

Asinovsky, Olga, Dec. 22, 2006 Office Action from U.S. Appl. No. 10/791,049, filed Mar. 2, 2004 (11 pp.).

Asinovsky, Olga, Jun. 7, 2007 Office Action from U.S. Appl. No. 10/791,049, filed Mar. 2, 2004 (11 pp.).

Asinovsky, Olga, Nov. 28, 2007 Office Action from U.S. Appl. No. 10/791,049, filed Mar. 2, 2004 (9 pp.).

Asinovsky, Olga, May 21, 2008 Office Action from U.S. Appl. No. 10/791,049, filed Mar. 2, 2004 (11 pp.).

Asinovsky, Olga, Sep. 11, 2008 Office Action from U.S. Appl. No. 10/791,049, filed Mar. 2, 2004 (12 pp.).

Kiliman, Leszek B., Sep. 9, 2005 Office Action from U.S. Appl. No. 10/817,995, filed Apr. 5, 2004 (7 pp.).

Kiliman, Leszek B., Mar. 23, 2006 Office Action from U.S. Appl. No. 10/817,995, filed Apr. 5, 2004 (7 pp.).

Kiliman, Leszek B., Dec. 13, 2006 Office Action from U.S. Appl. No. 10/817,995, filed Apr. 5, 2004 (6 pp.).

Kiliman, Leszek B., Sep. 5, 2008 Office Action from U.S. Appl. No. 10/817,995, filed Apr. 5, 2004 (5 pp.).

Wyrozebski Lee, Katarzyna I., Dec. 19, 2006 Office Action from U.S. Appl. No. 10/872,731, filed Jun. 21, 2004 (6 pp.).

Wyrozebski Lee, Katarzyna 1., Mar. 7, 2007 Office Action from U.S. Appl. No. 10/872,731, filed Jun. 21, 2004 (13 pp.).

Wyrozebski Lee, Katarzyna I., Sep. 14, 2007 Office Action from U.S. Appl. No. 10/872,731, filed Jun. 21, 2004 (9 pp.).

Chevalier, Alicia Ann, Sep. 6, 2006 Office Action from U.S. Appl. No. 10/886,283, filed Jul. 6, 2004 (5 pp.).

Chevalier, Alicia Ann, Jan. 4, 2007 Office Action from U.S. Application No, 10/886,283, filed Jul. 6, 2004 (8 pp.).

Chevalier, Alicia Ann, Jul. 2, 2007 Office Action from U.S. Appl. No. 10/886,283, filed Jul. 6, 2004 (8 pp.).

Chevalier, Alicia Ann, Jan. 4, 2008 Office Action from U.S. Appl. No. 10/886,283, filed Jul. 6, 2004 (8 pp.).

Mullis, Jeffrey C., Oct. 31, 2006 Office Action from U.S. Appl. No. 11/050,115, filed Feb. 3, 2005 (6 pp.).

Mullis, Jeffrey C., Mar. 24, 2008 Office Action from U.S. Appl. No. 11/050,115, filed Feb. 3, 2005 (10 pp.).

Mullis, Jeffrey C., Aug. 21, 2008 Office Action from U.S. Appl. No. 11/050,115, filed Feb. 3, 2005 (7 pp.).

Lipman, Bernard., Sep. 29, 2006 Office Action from U.S. Appl. No. 11/058,156, filed Feb. 15, 2005 (5 pp.).

Raza, Saira B., Oct. 20, 2005 Office Action from U.S. Appl. No. 11/104,759, filed Apr. 13, 2005 (10 pp.).

Raza, Saira B., Aug. 21, 2006 Office Action from U.S. Appl. No. 11/104,759, filed Apr. 13, 2005 (6 pp.).

Haider, Saira Bano, May 16, 2007 Office Action from U.S. Appl. No. 11/104,759, filed Apr. 13, 2005 (9 pp.).

Haider, Saira Bano, Oct. 30, 2007 Office Action from U.S. Appl. No. 11/104,759, filed Apr. 13, 2005 (9 pp.).

Haider, Saira Bano, Jun. 12, 2008 Office Action from U.S. Appl. No. 11/104,759, filed Apr. 13. 2005 (10 pp.).

Harlan, Robert D., Nov. 7, 2005 Office Action from U.S. Appl. No. 11/117,981 filed, Apr. 29, 2005 (7 pp.).

Harlan, Robert D., Jul. 20, 2006 Office Action from U.S. Appl. No. 11/117,981, filed Apr. 29, 2005 (6 pp.).

Harlan, Robert D., Jan. 26, 2007 Office Action from U.S. Appl. No. 11/117,981, filed Apr. 29, 2005 (8 pp.).

Harlan, Robert D., Jul. 12, 2007 Office Action from U.S. Appl. No. 11/117,981, filed Apr. 29, 2005 (6 pp.).

Harlan, Robert D., Jan. 2, 2008 Office Action from U.S. Appl. No. 11/117,981, filed Apr. 29, 2005 (6 pp.).

Harlan, Robert D., Jul. 25, 2008 Office Action from U.S. Appl. No. 11/117,981, filed Apr. 29, 2005 (8 pp.).

Maksymonko, John M., Feb. 20, 2008 Office Action from U.S. Appl. No. 11/305,279, filed Dec. 16, 2005 (14 pp.).

Maksymonko, John M., Aug. 6, 2008 Office Action from U.S. Appl. No. 11/305,279, filed Dec. 16, 2005 (11 pp.).

Maksymonko, John M., Jul. 17, 2008 Office Action from U.S. Appl. No. 11/305,281, filed Dec. 16, 2005 (13 pp.).

Le, Hoa T., Sep. 25, 2008 Office Action from U.S. Appl. No. 11/612,554, filed Dec. 19, 2006 (8 pp.).

Maksymonko, John M., Jun. 13, 2008 Office Action from U.S. Appl. No. 11/641,514, filed Dec. 19, 2006 (7 pp.).

Mullis, Jeffrey C., Oct. 31, 2008 Office Action from U.S. Appl. No. 11/641,514, filed Dec. 19, 2006 (10 pp.).

Maksymonko, John M., Jun. 11, 2008 Office Action from U.S. Appl. No. 11/642,124, filed Dec. 20, 2006 (16 pp.).

Maksymonko, John M., May 30, 2008 Office Action from U.S. Appl. No. 11/642,795, filed Dec. 20, 2006 (12 pp.).

Maksymonko, John M., May 28, 2008 Office Action from U.S. Appl. No. 11/642,802, filed Dec. 20, 2006 (10 pp.).

Chen, Jizhuang, Dec. 30, 2005 Office Action from Chinese Patent Application No. 02819527.2 filed Oct. 4, 2002 (9 pp.).

Chen, Jizhuang, Dec. 21, 2007 Office Action from Chinese Patent Application No. 02819527.2 filed Oct. 4, 2002 (12 pp.).

Chen, Jizhuang, Sep. 26, 2008 Office Action from Chinese Patent Application No. 02819527.2 filed Oct. 4, 2002 (4 pp.).

Schutte, M., Aug. 8, 2006 Office Action from European Patent Application No. 02807196.7 filed Oct. 4, 2002 (5 pp.).

Schutte, Maya, Sep. 3, 2007 Office Action from European Patent Application No. 02807196.7 filed Oct. 4, 2002 (2 pp.).

Watanabe, Y., May 7, 2008 Office Action from Japanese Patent Application No. 582224/2003 filed Oct. 4, 2002 (5 pp.).

Watanabe, Y., Jul. 29, 2008 Office Action from Japanese Patent Application No. 582224/2003 filed Oct. 4, 2002 (17 pp.).

May 30, 2008 International Search Report from PCT Patent Application No. PCT/US2007/026031 filed Dec. 19, 2007 (4 pp.).

May 27, 2008 International Search Report from PCT Patent Application No. PCT/US2007/087869 filed Dec. 18, 2007 (4 pp.).

Aug. 25, 2008 International Search Report from PCT Patent Application No. PCT/US2008/068838 filed Jun. 30, 2008 (4 pp.).

Haider, Saira Bano, Mar. 3, 2009 Advisory Action from U.S. Appl. No. 11/104,759 (3 pp.).

Sykes, Altrev C., Oct. 16, 2009 Office Action from U.S. Appl. No. 11/818,023 [20 pp.].

Mullis, Jeffrey C., Nov. 9, 2009 Office Action from U.S. Appl. No. 11/641,514 [9 pp.].

Mulcahy, Peter D., Nov. 9, 2009 Final Office Action from U.S. Appl. No. 11/642,802 [6 pp.].

Kiliman, Leszek B., Nov. 13, 2009 Office Action from U.S. Appl. No. 10/817,995 [6 pp.].

Chevalier, Alicia Ann, Nov. 25, 2009 Office Action from U.S. Appl. No. 10/886,283 [7 pp.].

Zemel, Irina Sopja, Dec. 3, 2009 Final Office Action from U.S. Appl. No. 11/305,279 [10 pp.].

Harlan, Robert D., Dec. 4, 2009 Notice of Allowance from U.S. Appl. No. 11/117,981 [5 pp.].

Mullis, Jeffrey C., Dec. 18, 2009 Supplemental Notice of Allowability from U.S. Appl. No. 11/050,115 [2 pp.].

Peets, Monique R., Jan. 5, 2010 Final Office Action from U.S. Appl. No. 11/697,801 [9 pp.].

Pak, Hannah J., Jan. 6, 2010 Final Office Action from U.S. Appl. No. 11/941,128 [10 pp.].

* cited by examiner

Maleated Particles

Original Particles

RUBBER COMPOSITION CONTAINING FUNCTIONALIZED POLYMER NANOPARTICLES

BACKGROUND OF THE INVENTION

The present invention relates to polymer nanoparticles, methods for their preparation, and their use as, for example, additives for rubber and tire compositions. The invention advantageously provides mechanisms for surface modifications, functionalization, and general characteristic tailoring to improve performance in various host compositions.

Polymer nanoparticles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

Nanoparticles can be discrete particles uniformly dispersed throughout a host composition. Nanoparticles preferably are monodisperse in size and uniform in shape. However, controlling the size of nanoparticles during polymerization and/or the surface characteristics of such nanoparticles can be difficult. Accordingly, achieving better control over the surface composition of such polymer nanoparticles also is desirable.

Rubbers may be advantageously modified by the addition of various polymer compositions. The physical properties of rubber moldability and tenacity are often improved through such modifications. Of course, however, the simple indiscriminate addition of nanoparticles to rubber is likely to cause degradation of the matrix material, i.e., the rubber, characteristics. Moreover, it is expected that primarily the selection of nanoparticles having suitable size, material composition, and surface chemistry, etc., will improve the matrix characteristics.

In this regard, development of nanoparticles having a outer layer which would be compatible with a wide variety of matrix materials is desirable because discrete particles could likely disperse evenly throughout the host to provide a uniform matrix composition. However, the development of a process capable of reliably producing acceptable nanoparticles has been a challenging endeavor. For example, the solubility of various monomers in traditional alkane solvents has made solution polymerization a difficult process by which to achieve nanoparticles having a variety of outer layers. Moreover, the development of a solution polymerization process producing reliable nanoparticles, particularly nanoparticles advantageously employed in rubber compositions, has been elusive.

Commonly owned U.S. Pat. No. 6,437,050 is directed to polymer nanoparticles and a method of forming nanoparticles with desired surface characteristics and size. Commonly owned U.S. patent application Ser. No. 10/223,393 (filed Aug. 19, 2002) includes a method of controlling the surface characteristics of polymer nanoparticles via surface functionalization. In this application the functional groups remain inside the nanoparticle in the form of an organic reaction residue.

Nano-scale metal composites have also been used advantageously in a variety of fields including, but not limited to, information technology, medicine and health, material and manufacturing, aeronautics and space exploration, environmental, and energy fields. Formation of nano-scale metal composites has often proven difficult due to the expense and difficulty of creating known templates, as well as the often difficult step of separating the composites from the template.

Accordingly, it would be desirable to develop polymer nanoparticles with desirable surface characteristics and size. It would also be desirable to develop a process for using these nanoparticles as templates to produce nano-scale metal composites.

SUMMARY OF THE INVENTION

A polymer nanoparticle is provided. The nanoparticle includes an inner layer having alkenylbenzene monomer units. The nanoparticle further includes an outer layer having monomer units selected from conjugated dienes, alkylenese, alkenylbenzenes, and mixtures thereof. The nanoparticle has at least one functional group associated with the outer layer.

A process for forming functionalized nanoparticles is also provided. The process includes polymerizing alkenylbenzene monomer and conjugated diene monomer in a hydrocarbon solvent to form a diblock polymer. After formation of the diblock polymer, micelles of the diblock polymer are formed. At least one crosslinking agent is added to the micelles to form crosslinked nanoparticles having a poly(alkenylbenzene) core and an outer poly(conjugated diene) layer from the micelles. The poly(conjugated dienee) layer is optionally hydrogenated to form nanoparticles containing a poly(alkenylbenzene) core and a polycrystalline outer layer. After formation, the nanoparticles are reacted with a compound including at least one functional group to form functionalized nanoparticles. The reaction may be carried out before or after hydrogenation.

According to a further embodiment, a polymer nanoparticle including a poly(alkynylbenzene) core, a copolymer outer layer and at least one functional group attached thereto is also provided. The copolymer outer layer includes at least an alkenylbenzene monomer unit and a conjugated diene monomer unit. The nanoparticle has a mean average diameter less than about 100 nm.

A process for forming a polymer nanoparticle with a copolymer outer layer and at least one functional group attached thereto is also provided. The process includes copolymerizing at least one alkenylbenzene monomer and at least one conjugated diene to form a random copolymer. After the polymerization is substantially completed, an additional charge of alkenylbenzene monomer is made and polymerized onto the copolymer chain ends to form a diblock copolymer. Micelles of the diblock copolymer are formed and at least one crosslinking agent is added to the polymerization mixture to form crosslinked nanoparticles. The nanoparticles have a mean average diameter less than about 100 nm. After formation, the nanoparticles are reacted with a compound including at least one functional group to form functionalized nanoparticles.

DETAILED DESCRIPTION OF ILLUSTRATIVE EMBODIMENTS

General Nanoparticle Process of Formation

Figure 1:
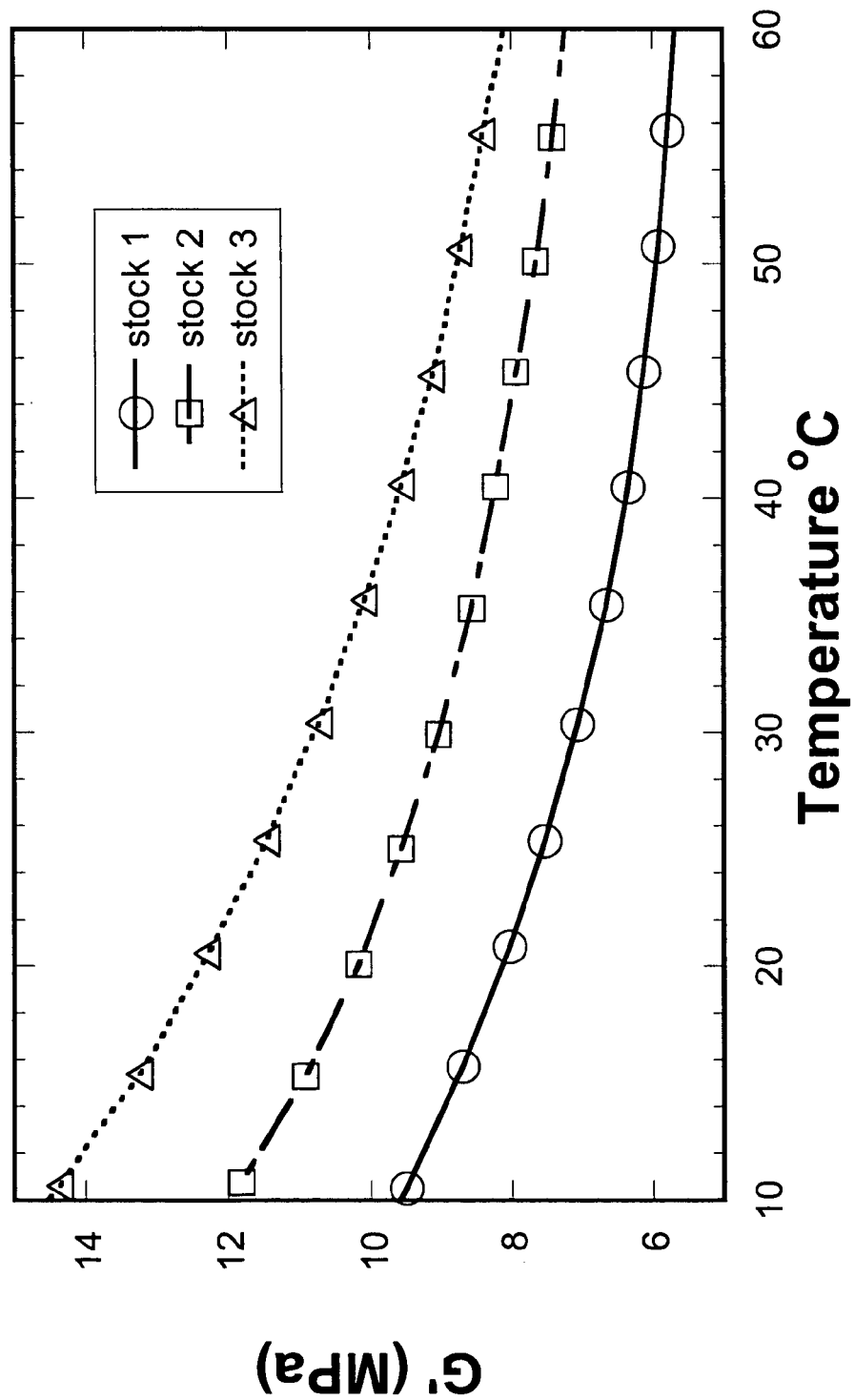
FIG. 1 is a graph depicting the dynamic modulus (G') temperature dependence of rubber composition prepared in accordance with EXAMPLES 3, 4, and 5.

One exemplary functionalied polymer nanoparticle of the present invention is formed from diblock polymer chains having at least a poly(conjugated diene) block and a poly(alkenylbenzene) block. The poly(alkenylbenzene) blocks may be crosslinked to form the desired nanoparticles. After nanoparticle formation, the resultant nanoparticles are reacted with an organic compound to form functionalized nanoparticles. The functionalized nanoparticles preferably have at least one functional group associated with an outer layer or on an exterior of the nanoparticle. The funcationlzied nanoparticles have diameters—expressed as a mean average diameter—that are preferably less than about 100 nm, more preferably less than about 75 nm, and most preferably less than about 50 nm. The nanoparticles preferably are substantially monodisperse and uniform in shape. The dispersity is represented by the ratio of $M_w$ to $M_n$, with a ratio of 1 being substantially monodisperse. The polymer nanoparticles of the present invention preferably have a dispersity less than about 1.3, more preferably less than about 1.2, and most preferably less than about 1.1. Moreover, the nanoparticles are preferably spherical, though shape defects are acceptable, provided the nanoparticles generally retain their discrete nature with little or no polymerization between particles.

The nanoparticles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination. However, as more fully described herein below, selection of a solvent in which one polymer forming the nanoparticles is more soluble than another polymer forming the nanoparticles is important in micelle formation.

With respect to the monomers and solvents identified herein, nanoparticles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature, and solvent facilitates the formation of block polymers which form micelles and ultimately the desired nanoparticles.

According to one embodiment of the invention, a diblock polymer is formed of vinyl aromatic hydrocarbon monomers and conjugated diene monomers in the hydrocarbon solvent. The diblock polymer contains at least a first end block that is soluble in the dispersion solvent, preferably a conjugated diene monomer, and at least a second end block which is less soluble in the dispersion solvent, preferably a vinyl-substituted aromatic hydrocarbon monomer. Moreover, in one preferred embodiment, a vinyl-substituted aromatic hydrocarbon monomer is chosen, the polymer of which is generally insoluble in the dispersion solvent.

As is known in the art, such a diblock copolymer may be formed by living anionic polymerization, in which a vinyl-substituted aromatic hydrocarbon monomer is added to a completely polymerized conjugated diene monomer. Another method of forming substantially diblock polymers is the living anionic copolymerization of a mixture of monomers, such as a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the vinyl-substituted aromatic hydrocarbon. Of course, certain advantages, as described below may be achieved via a random polymerization of at least one block of the polymer.

Nonetheless, it is generally preferred that a vinyl substituted aromatic hydrocarbon polymerize last, positioning the living end of the polymerizing polymer on a vinyl aromatic block to facilitate later cross-linking.

Such copolymers, formed by either method, are believed to aggregate to form micelle-like structures with, for example, vinyl-substituted aromatic blocks directed toward the centers of the micelles and conjugated diene blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 40 and 100° C., more preferably between about 50 and 80° C.

After the micelles have formed, additional conjugated diene monomer and/or vinyl-substituted aromatic hydrocarbon monomer can be added to the polymerization mixture as desired.

After formation of the micelles, a cross-linking agent is added to the polymerization mixture. Preferably, a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the desired nanoparticle. Consequently, nanoparticles are formed from the micelles with a core including, for example, styrene monomer units and a outer layer including, for example, butadiene monomer units.

The conjugated diene monomers contemplated for the block polymer are those soluble in non-aromatic hydrocarbon solvents. $C_4$-$C_8$ conjugated diene monomers are the most preferred. Exemplary conjugated diene monomers include 1,3-butadiene, isoprene, 1,3-pentadiene, 2,3-dimethyl-1,3-butadiene, 1,3-hexodiene, 2-methyl-1,3-pentadiene, 3,4-dimethyl-1,3-hexodiene, 4,5-diethyl-1,3-octadiene, phenyl-1,3-butadiene, and mixtures thereof. An especially preferred conjugated diene is 1,3-butadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is not greater than 18, as well as any di- or tri-vinyl substituted aromatic hydrocarbons, and mixtures thereof.

The diblock polymer, preferably has $M_w$ of about 5,000 to 200,000, more preferably between about 10,000 and 100,000. A typical diblock polymer will be comprised of 5 to 95% by weight conjugated diene and 5 to 95% by weight vinyl-substituted aromatic hydrocarbon, more preferably 20 to 80% by weight, and most preferably 50 to 60% by weight of each contributed monomer type.

The micelle formed by the polymerization of vinyl-substituted aromatic hydrocarbons and conjugated diene monomers is preferably crosslinked to enhance the uniformity and permanence of shape and size of the resultant nanoparticle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

A 1,2-microstructure controlling agent or randomizing modifier is optionally used to control the 1,2-microstructure in the conjugated diene contributed monomer units, such as 1,3-butadiene, of the nanoparticle. Suitable modifiers include hexamethylphosphoric acid triamide, N,N,N',N-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the outer layer of the polymer nanoparticle. The 1,2-microstructure content of the conjugated diene units is preferably between about 5 and 95%, more preferably between about 1 and 99%.

Without being bound by theory, it is believed that an exemplary micelle will be comprised of ten to five hundred diblock polymers yielding, after crosslinking, a nanoparticle having a $M_w$ of between about 5,000 and 10,000,000, preferably between about 5,000 and 4,500,000.

Functionalization of Polymer Nanoparticles

After micelle formation, or alternatively after crosslinking, the polydiene blocks may be functionalized to form a an outer layer funcationalized polymer nanoparticle. The functional group is preferably selected from the group consisting of maleimide, hydroxyl, carboxy, formyl, azocarboxy, epoxide, amino, and mixtures thereof.

Without being bound by theory, it is believed that a funcational group is added to the nanoparticle by reacting a compound including the desired functional group with the polydiene blocks of the nanoparticles.

The reaction is preferably carried out in a hydrocarbon solvent in an inert atmosphere at a temperature between about 100 and 250° C. Suitable solvents includes aliphatic hydrocarbons, such as pentane, hexane, heptane, octane, nonane, decane, and the like, as well as alicyclic hydrocarbons, such as cyclohexane, methyl cyclopentane, cyclooctane, cycloheptane, cyclononane, cyclodecane, and the like. These hydrocarbons may be used individually or in combination. Of course, other known methods for conducting such reactions are contemplated.

The functional group reacts with double bonds present in the outer layer of the nanoparticles. Preferably the reaction will reach greater than 1%, more preferably greater than 10% completion.

Structural Modifications

In an alternative embodiment, an outer layer of the funcationalized polymer nanoparticle is a copolymer including at least one alkenylbenzene monomer unit and at least one conjugated diene monomer unit. The copolymer may be random or ordered. Accordingly, the outer layer may include an SBR rubber. Herein throughout, references to a poly (conjugated diene) outer layer are understood to include copolymers of the type described here.

Similarly, the density of the nanoparticle may be controlled by including diblock and monoblock polymer chains in the micelles. One method for forming such polymer chains includes forming a first polymer of conjugated diene monomers in the hydrocarbon solvent. After formation of the first polymer, a second monomer is added to the polymerization, along with additional initiator. The second monomer polymerizes onto the first polymer to form a diblock polymer as well as forming a separate second polymer which is a monoblock polymer. The diblock polymer contains at least a first end block that is soluble in the dispersion solvent, preferably a conjugated diene monomer, and a second end block which is less soluble in the dispersion solvent, preferably a vinyl-substituted aromatic hydrocarbon monomer. In a preferred embodiment, a vinyl-substituted aromatic hydrocarbon is chosen which as a polymer is generally insoluble in the dispersion solvent.

The multi-block polymer preferably has $M_w$ of about 5,000 to 10,000,000 more preferably between about 10,000 and 200,000. A typical diblock polymer will be comprised of 5 to 95% by weight conjugated diene and 5 to 95% by weight vinyl-substituted aromatic hydrocarbon, more preferably 20 to 80% by weight, and most preferably 30 to 70% by weight of each contributed monomer type. Each block preferably has $M_w$ between about 1,000 and 10,000,000, more preferably between about 2,000 and 5,000,000.

The density of the poly (conjugated diene) outer layer of the nanoparticles may be controlled by manipulating the ratio of diblock to mono-block polymer chains. This ratio may be manipulated by altering the amount of initiator added during each step of the polymerization process. For example, a greater amount of initiator added during the polymerization of the conjugated diene monomer than added during the polymerization of the alkenylbenzene monomer would favor diblock formation over mono-block formation resulting in a high density outer layer. Conversely, a greater amount of initiator added during the polymerization of the alkenylbenzene monomer than added during the polymerization of the conjugated diene monomer would favor mono-block formation over diblock formation, resulting in a low density outer layer. The ratio of mono-blocks to diblocks can be from 1 to 99, preferably 10 to 90, more preferably 20 to 80.

Hydrogenation of a Nanoparticle Outer Layer

After micelle formation, or alternatively, after crosslinking, the polydiene blocks may be hydrogenated to form a modified outer layer. A hydrogenation step may also be carried out after functionalization of the nanoparticles. A hydrogenation step may be carried out by methods known in the art for hydrogenating polymers, particularly polydienes. A preferred hydrogenation method includes placing the crosslinked nanoparticles in a hydrogenation reactor in the presence of a catalyst. After the catalyst has been added to the reactor, hydrogen gas ($H_2$) is charged to the reactor to begin the hydrogenation reaction. The pressure is adjusted to a desired range, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $^1H$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octanoate, nickel ethylhexanoate, and mixtures thereof.

The outer layer formed by an optional hydrogenation step will vary depending on the identity of the monomer units utilized in the formation of the nanoparticle outer layer, particularly the poly (conjugated diene) blocks. For example, if the poly(conjugated diene) block contains 1,3-butadiene monomer units, the resultant nanoparticle layer after hydrogenation will be a crystalline poly(ethylene) layer. In another embodiment, a layer may include both ethylene and propylene units after hydrogenation if the non-hydrogenated poly (conjugated diene) block contains isoprene monomer units. It should be noted that the non-hydrogenated poly (conjugated diene) block may contain a mixture of conjugated diene monomer units, or even alkenylbenzene units, resulting in a mixture of monomer units after hydrogenation.

Initiators

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$-$C_{20}$ hydrocarbyl radical, preferably a $C_2$-$C_8$ hydrocarbyl radical, and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Other suitable lithium initiators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Anionic initiators generally are useful in amounts ranging from about 0.01 to 60 millimoles per hundred grams of monomer charge.

Polymer Nanoparticle Applications

A variety of applications are contemplated for use in conjunction with the nanoparticles of the present invention. Furthermore, the several mechanisms described herein for modifying the nanoparticles render them suitable for different applications. All forms of the present inventive nanoparticles are, of course, contemplated for use in each of the exemplary applications and all other applications envisioned by the skilled artisan.

General Rubber

After the functionalized polymer nanoparticles have been formed, they may be blended with a rubber to improve the physical characteristics of the rubber composition. Functionalized nanoparticles are useful modifying agents for rubbers because they are discrete particles which are capable of dispersing uniformly throughout the rubber composition, resulting in uniformity of physical characteristics. Furthermore, certain of the present functionalized nanoparticles are advantageous because the outer layer of poly(conjugated diene), especially vinyl-modified poly(conjugated diene), is capable of bonding with the rubber matrix due to the accessibility of the double bonds in the poly(conjugated diene).

The present polymer nanoparticles are suitable for modifying a variety of rubbers including, but not limited to, random styrene/butadiene copolymers, butadiene rubber, poly (isoprene), nitrile rubber, polyurethane, butyl rubber, EPDM, and the like. Advantageously, the inclusion of the present nanoparticles have demonstrated rubbers having improved tensile and tear strength of at least about 30% over a rubber modified with non-spherical copolymers.

Furthermore, nanoparticles with hydrogenated outer layers may demonstrate improved compatibility with specific rubbers. For example, nanoparticles including a hydrogenated polyisoprene outer layer may demonstrate superior bonding with and improved dispersion in an EPDM rubber matrix due to the compatibility of hydrogenated isoprene with EPDM rubber.

Additionally, nanoparticles with copolymer surfaces may demonstrate improved compatibility with rubbers. The copolymer tails with the outer layer of the nanoparticles may form a brush-like surface. The host composition is then able to diffuse between the tails allowing improved interaction between the host and the nanoparticles.

Metal Nanocomposite Formation

Functionalized nanoparticles produced in accordance with the present invention may be advantageously utilized in the formation of metal nanocomposites which can be advantageously added to rubber compositions. The formation of metal nanocomposites is preferably carried out by exposing functionalized nanoparticles to metals, preferably metals in solution. The metal is then capable of complexing with functional groups located throughout an outer layer of the funcationalized nanoparticle. The poly(conjugated diene) and/or polyalkylene layer may restrict the growth of the metal nanocomposites, thus providing size control of the metal nanocomposites. Metals contemplated for use in the present invention include those known in the art as useful in the form of nanocomposites, including but not limited to Cu, Ti, Fe, Cd, Ni, Pd, and mixtures thereof. The formation of the metal nanocomposites is preferably carried out at temperature of between about 0 and 100° C., more preferably between about 0 and 5° C. Preferred solvents useful in the formation include toluene, THF, water, alcohol, and mixtures thereof.

Hard Disk Technology

Hydrogenated functionalized nanoparticles prepared in accordance with the present invention may also find application in hard disk technology.

Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. The hydrogenated nanoparticles, when compounded with a polyalkylene and a rubber, demonstrate a tensile strength comparable to that necessary in hard disk drive compositions.

Thermoplastic Gels

Funcationalized nanoparticles prepared in accordance with the present invention, whether hydrogenated or non-hydrogenated may also be blended with a variety of thermoplastic elastomers, such as SEPS, SEBS, EEBS, EEPE, polypropylene, polyethylene, and polystyrene. For example, nanoparticles with hydrogenated isoprene outer layers may be blended with a SEPS thermoplastic to improve tensile strength and thermostability. These blends of thermoplastic elastomer and maleated nanoparticles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions of the present invention are low molecular weight organic materials having a number-average molecular weight of less than 20,000, preferable less than 10,000, and most preferably limitation to the material which may be employed, the following is a list of examples of appropriate materials:

(1) Softening agents, namely aromatic naphthenic and paraffinic softening agents for rubbers or resins;

(2) Plasticizers, namely plasticizers composed of esters including phthalic, mixed pthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumaroneindene resins, terpene phenol resins, petroleum hydrocarbons and rosin derivative;

(4) Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadieneacrylonitrile rubber, polychloroprene, etc.), silicone oligomers, and poly-α-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bisfatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and, (6) Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used in as extenders.

Tire Rubber

One application for functionalized nanoparticle containing rubber compounds is in tire rubber formulations.

Vulcanizable elastomeric compositions of the invention may be prepared by mixing a rubber, a functionalized nanoparticle composition, with a reinforcing filler comprising silica, or a carbon black, or a mixture of the two, a processing aid and/or a coupling agent, a cure agent, and an effective amount of sulfur to achieve a satisfactory cure of the composition.

Preferred rubbers are conjugated diene polymers, copolymers, or terpolymers of conjugated diene monomers and monovinyl aromatic monomers, can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epichrolohydrin rubber, chlorinated polyethylene-propylene rubbers, chlorosulfonated polyethylene rubber, hydrogenated nitrile rubber, tetrafluoroethylene-propylene rubber and mixtures thereof.

Examples of reinforcing silica fillers which can be used in the vulcanizable elastomeric composition include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. Silica can be employed in the amount of about one to about 100 parts per hundred parts of the elastomer, preferably in an amount of about 5 to 80 phr and, more preferably, in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165 MP), and J. M. Huber Corporation.

Including surface functionalized nanoparticles in silica containing rubber compositions has been shown to decrease the shrinkage rates of such silica containing rubber compositions. Maleated nanoparticles may be compounded in silica compositions in concentrations up to about 30 wt % of the total composition, more preferably up to about 40 wt %, most preferably up to about 50 wt %.

The rubber can be compounded with all forms of carbon black, optionally additionally with silica. The carbon black can be present in amounts ranging from about one to about 100 phr. The carbon blacks can include any of the commonly available, commercially-produced carbon blacks, but hose have a surface are of at least 20 $m^2/g$ and, or preferable, at least 35 $m^2/g$ up to 200 $m^2/g$ or higher are preferred. Among useful carbon blacks are furnace black, channel blacks, and lamp blacks. A mixture of two or more of the above blacks can be used in preparing the carbon black products of the invention. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 40 phr.

Numerous coupling agents and compatibilizing agents are known for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in the conventional amounts.

Specifically, the above-described functionalized nanoparticle containing rubber compounds are contemplated for use in rubber compounds used to make tire treads and side walls due to the enhanced reinforcement capabilities of the present nanoparticles. The higher dynamic modulus (G') and its lower temperature dependence along with the lower hysteresis values ag high temperature leads to the improved cornering, handling, dry, snow, and wet traction, rolling resistance, dispersion, and aging properties of the resultant tire compositions. Improved aging properties, thermal aging (high temperature) or mechanical aging (static or dynamic deformation cycles), include retention of the G' modulus, hysteresis, mechanical strengths, etc. Tin-functionalized nanoparticles are especially suited for use in tire compositions. Nanoparticles including a copolymer outer layer are also suitable for use in such tire compositions, because the longer copolymer chains in the outer layer leads to greater diffusion of the host rubber composition into the outer layer of the nanoparticle.

Engineering Plastics and Others

Similarly, the functionalized nanoparticles can be added into typical plastic materials, including polyethylene, polypropylene, polystyrene, polycarbonate, nylon, polyimides, etc. to for example, enhance impact strength, tensile strength and damping properties.

Of course, the present inventive functionalized nanoparticles are also suited to other presently existing applications for nanoparticles, including the medical field, e.g. drug delivery and blood applications, information technology, e.g. quantum computers and dots, aeronautical and space research, energy, e.g., oil refining, and lubricants.

Engine Mount, Etc.

Another application for such rubbers is in situations requiring superior damping properties, such as engine mounts and hoses (e.g. air conditioning hoses). Rubber compounds of high mechanical strength, super damping properties, strong resistance to creep are demanded in engine mount manufacturers. In engine mount, a rubber, because it sits most of its life in a packed and hot position require rubbers of very good characteristics. Utilizing the functionalized nanoparticles within selected rubber formulations can improve the characteristics of the rubber compounds.

The following examples are provided to help illustrate the present invention. The examples are not intended to limit the scope of the invention as defined by the appended claims.

EXAMPLES

Example 1

Synthesis of PBD-PS Micelle Polymers

All of the polymers were prepared by anionic polymerization in hexane through three stages. In the first stage, butadiene (BD) and styrene (ST) were charged into the reactor which the polymerization was initiated with butyl lithium (BuLi) and the microstructure was controlled by adding oligomeric oxolanyl propane polar randomizer (OOPS). The polymer molecular weight (MW) was controlled by adjusting the ratio of the monomers and the level of imitator used. After nearly all of the monomers were consumed in the first stage, additional styrene was charged for polymerization for certain period of time to form the micelle PS core in the second stage. The 50 mL of the divinyl benzene (DVB) was charged into the reactor in the third stage to crosslink the micelle PS domain. The stoichiometry of the initiator, modifier, monomers, and DVB used to prepare these micelle polymers are detailed in Table 1. The polymerization temperature was maintained at 57° C. in all of the stages. All of these polymers were isolated by the addition of a mixture of acetone and isopropanol in a volume ratio of 95% to 5%. Tet-butyl-2 hydroxy toluene (BHT) was then added into the polymer as an antioxidant.

TABLE 1

Stiochimetry of the initiator, modifier, monomers, and DVB employed for polymerization Process.

| | Polymerization Stage | | | | |
|---|---|---|---|---|---|
| | 1$^{st}$ Stage | | 2$^{nd}$ Stage | | |
| | 1.68 M BuLi | 1.6 M OOPs | 22 wt % butadiene in hexane | 33 wt % styrene in hexane | 3$^{rd}$ Stage DVB |
| Example 1 | 5.0 mL | 2.5 mL | 1.02 kg | 0.68 kg | 50 mL |

Example 2

Synthesis of Maleated Functionalized PBD-PS Micelle Polymers (M-PBD-PS)

Sixty grams of maleic anhydride in 300 ml of DTDP oil under the continuous purge of nitrogen gas were heated to 170° C. 500 mL of the hexane solution that contained 10% of the product from Example 1, PBD-PS, was slowly added into the maleic anhydride solution in two hours. After the completion of the addition of PBD-PS, it was heated to 180° C. for 30 minutes before dropping into toluene solvent and isolated with isopropanol. 2.8 wt % of maleic anhydride was found covalently bonded to the PBD layer of the M-PBD-PS nanoparticles, as confirmed by $^{13}$C NMR analysis. The maleated nanoparticles are not soluble in hexane.

The characterization of these polymers include $M_w$, molecular weight distribution (MWD), polymer microstructure, and $T_g$ are displayed in Table 2.

TABLE 2

Characterization data of nanoparticles from Examples 1 and 2

| Polymer | SBR-Duradiene 715 | Example 1 | Example 2 |
|---|---|---|---|
| $M_w$ of the polymer | | 1,026,960 | 1,026,960 |
| $M_w$ of single PS in micelle core | N/A | 50,000 | 50,000 |
| MWD | N/A | 1.11 | 1.11 |
| Cis BR % | 23.5 | 18 | 18 |
| Trans BR % | 47 | 60 | 60 |

Examples 3-5

Compounding of PBD-PS and M-PBD-PS Nanoparticles

Rubber Compound Preparation

Three stocks of rubber compounds were prepared using the formulation and mixing conditions shown in Tables 3 and 4. Seventy phr of SBR Duradiene 715 and thirty parts of polybutadiene were used to prepare example 3, the control. An addition 10 phr of PBD-PS or M-PBD-PS was added to example 3 to form examples 4 and 5. The composition of the polymers used for each of the examples is listed in Table 5. The final stock was sheeted and then was subsequently molded at 171° C. for 15 minutes.

TABLE 3

Formulation used to prepare rubber compounds of Examples 3-5

| Component | Concentration (phr) |
|---|---|
| SBR (Duradiene 715) | 70.00 |
| PBD | 30.00 |
| Nanoparticle | Varied |
| Silica (HiSil 190) | 65.00 |
| Wax | 1.50 |
| Disulfide silane | 5.73 |
| Antioxidant [N-(1,3-dimethlybutyl)-N'-phenyl-p-phenylene-diamine] | 0.85 |
| Aromatic Process Oil | 16.25 |
| Sulfur | 1.30 |
| Steric acid | 2.00 |
| Accelerator [N-cyclohexyl-2-benzothiasole-sulfenaimde] | 1.50 |
| Diphenyl guanidine | 0.50 |
| Zinc oxide | 2.00 |

TABLE 4

The mixing conditions used to prepare the rubber compounds of Examples 3-5

| Mixer | 310 g Brabender |
|---|---|
| Agitation Speed | 60 rpm |
| | Master Batch Stage |
| Initial Temperature | 100° C. |
| 0 seconds | Charging polymers and nanoparticles (where included) |
| 30 seconds | Charging silica and all pigments |
| 5 minutes | Drop |
| Drop Temperature | 170° C. |
| | Remill 1 Batch Stage |
| Initial Temperature | 70° C. |
| 0 seconds | Charging remilled stock and silane |
| Drop Temperature | 145° C. |
| | Final Batch Stage |
| Initial Temperature | 90° C. |
| 0 seconds | Charging remilled stock |
| 30 seconds | Charging curing agent and accelerators |
| Drop Temperature | 105° C. |

TABLE 5

SBR, BR, PBD-PS and M-PBD-PS used to prepare examples 3-5

| Example | SBR-phr | BR-phr | PBD-PS phr | M-PBD-PS phr |
|---|---|---|---|---|
| 3 (control) | 70 | 30 | 0 | 0 |
| 4 | 70 | 30 | 10 | 0 |
| 5 | 70 | 30 | 10 | 10 |

The processing of the rubber compound was evaluated by examining the compound Mooney and scorch data along with the curing characteristic data. The Mooney viscosity and the curing characteristics of the uncured stocks are shown in Table 6. Mooney viscosity measurements were conducted at 130° C. using a large rotor. The Mooney viscosity data was recorded as the torque when rotor has rotated for 4 minutes. The sample was preheated at 130° C. for 1 minute before the rotor starts. $T_5$ is the time required to increase 5 Mooney units during the Mooney-scorch measurement. It is used as an index to predict how fast the compound viscosity will rise during processing such as extrusion processing. $T_{S2}$ and $T_{90}$ are the time when torque rises to 2% and 90% of the total increase during curing characterization experiment at 171° C.

They are used to predict the speed of the viscosity build-up ($T_{S2}$) and the curing rate during the curing process.

TABLE 6

Mooney scorch and curing characteristics

| Example | $ML_{1+4}$ @ 130° C. | $T_5$ scorch @ 130° C. (minutes) | $T_{S2}$ @ 171° C. (minutes) | $T_{90}$ @ 171° C. (minutes) |
|---|---|---|---|---|
| 3 (control) | 69.31 | 2900 | 0.84 | 20.94 |
| 4 | 70.88 | 3041 | 2.01 | 21.4 |
| 5 | 77.19 | N/A | 1.22 | 26.22 |

The Scorch $T_5$, $T_{S2}$, and curing characteristics of examples 4-5 were found to be comparable to the control (example 3). With the exception of the higher compound Mooney found for example 3, it is apparent that addition of ABR-PS polymer in rubber compounds will not affect the processing. The higher Mooney in silica compound can be adjusted by use of processing aids or shielding agents. Therefore, it is not expected to encounter apparent processing problems with these stocks containing nanoparticles.

Mechanical Properties:

Tensile Mechanical Properties:

The tensile mechanical properties of Examples 3-5 are listed in Table 7. The tensile mechanical properties were measured using the standard procedure described in ASTM-D 412 at 25° C. The tensile test specimens are round rings with a dimension of 0.05 inches in width and 0.075 inches in thickness. A specific gauge length of 2.54 cm is used for the tensile test.

TABLE 7

Tensile mechanical properties at 25° C.

| Example | M50 (Mpa) | M300 (Mpa) | Strength, Tb (Mpa) | Elongation at break, Eb, % | Toughness (Mpa) |
|---|---|---|---|---|---|
| 3 (control) | 1.39 | 9.49 | 14.78 | 409 | 26 |
| 4 | 1.43 | 8.81 | 15.47 | 450 | 30.56 |
| 5 | 1.51 | 8.39 | 14.64 | 454 | 30.04 |

Improvements in the tensile mechanical properties, including elongation at break (10%) and tensile toughness (15%), by addition of nanoparticles are evident. However, at an elevated temperature of 100° C., the improved mechanical properties found in PBD-PS examples at room temperature are not reproducible (as seen in Table 8, below). By replacing the PBD-PS nanoparticles with M-PBD-PS, better mechanical properties were obtained, as shown in Table 8.

TABLE 8

Tensile mechanical properties at 100° C.

| Example | M50 (Mpa) | M300 (Mpa) | Strength, Tb (Mpa) | Elongation at break, Eb, % | Toughness (Mpa) |
|---|---|---|---|---|---|
| 3 (control) | 1.15 | N/A | 7.48 | 289 | 10.05 |
| 4 | 1.14 | N/A | 7.13 | 299 | 10.14 |
| 5 | 1.14 | 6.69 | 7.95 | 348 | 13.23 |

The superior elevated temperature mechanical properties were also confirmed by the tensile mechanical properties obtained from dumbbell shape samples (Table 9).

TABLE 9

Tensile mechanical properties at 100° C. obtained from tensile test on dumbbell-shaped samples

| Example | M50 (Mpa) | M300 (Mpa) | Strength, Tb (Mpa) | Elongation at break, Eb, % | Toughness (Mpa) |
|---|---|---|---|---|---|
| 3 (control) | 1.94 | 7.72 | 8.09 | 315 | 13.93 |
| 4 | 1.85 | 6.89 | 8.01 | 355 | 15.71 |
| 5 | 1.92 | 6.82 | 8.35 | 379 | 17.71 |

Dynamic Mechanical Storage Modules (G')

Figure 2:
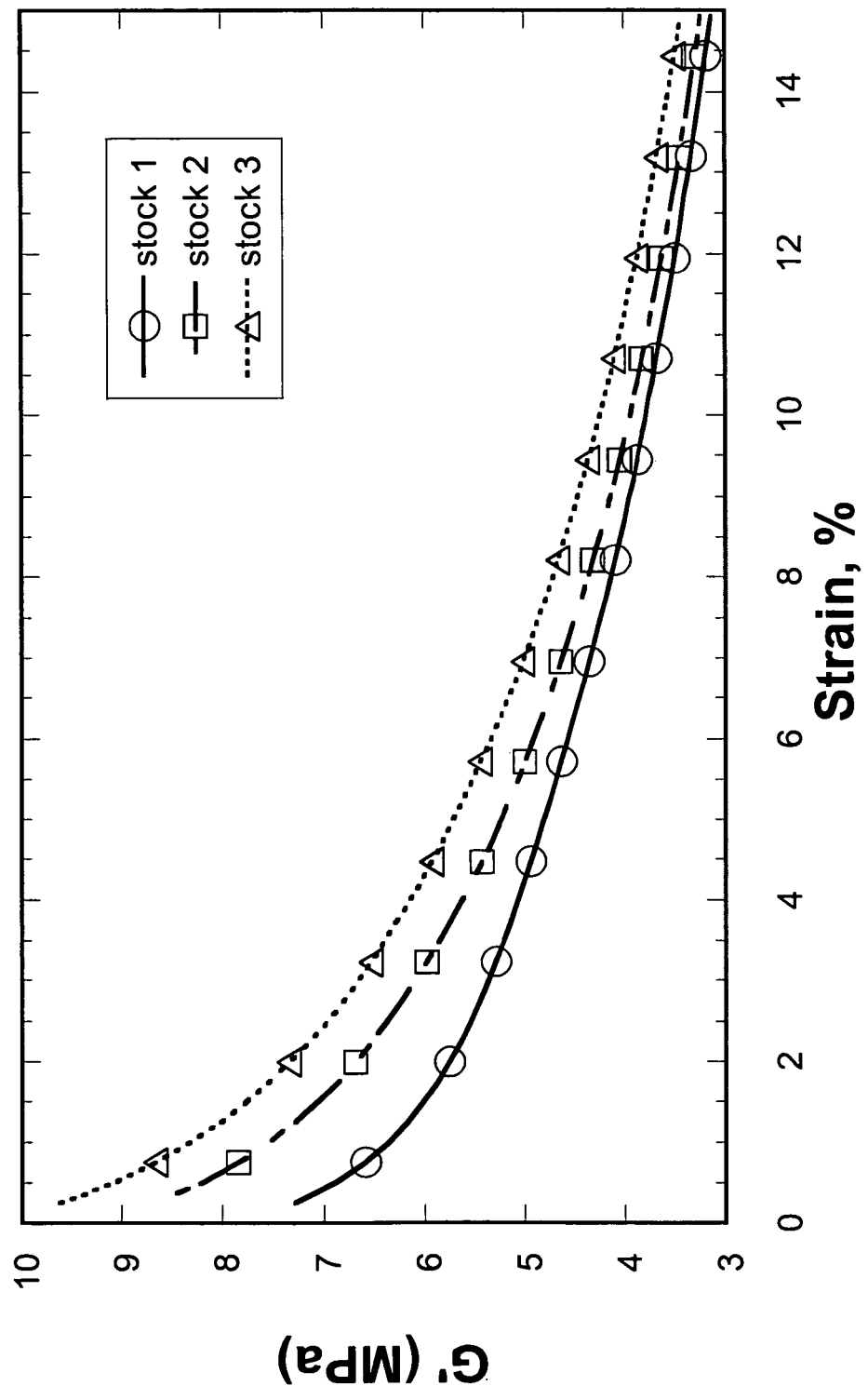
FIG. 2 is a graph depicting the G' strain dependence of rubber particles prepared in accordance with EXAMPLES 3, 4, and 5.

The dynamic viscoelastic storage modulus (G') of the cured stocks in shown in FIGS. 1 and 2, where data from FIG. 1 was obtained from temperature sweep experiments (TS) and data from FIG. 2 was obtained from 50° C. strain sweeps. Temperature sweep experiments were conducted with a frequency of 31.4 rad/sec using 0.5% strain for temperatures ranging from –100° C. to 100° C. A frequency of 3.14 rad/sec was used for strain sweep which is conducted at 50° C. with strain sweeping from 0.25% to 14.75%.

Improvements of G' at over a range of measured temperatures and applied strain levels of examples with M-PBD-PS over the PBD-PS and control examples are seen in FIGS. 1 and 2.

Wear Resistance

The wear resistance of the test samples was evaluated by weighing the amount of wear using the Lambourn test. The wearing index was obtained from the ratio of the weighty loss of the control to that of the tested sample. Samples with higher wear indices have better wear resistance properties. Samples used for Lambourn test are circular donuts with the following approximate dimensions: 0.9 and 1.9 inches in inside and outside diameter, and 0.195 inches in thickness. Test specimens are placed on an axle and run at a slip ratio of 65% against a driven abrasive surface.

The degraded abrasion resistance found in the PBD-PS added example can be improved by to the control level by replacing it with the M-PBD-PS. This can clearly be seen in the abrasion resistance data shown in Table 10.

TABLE 10

Abrasion Resistance Data

| Example | Abrasion resistance index |
|---|---|
| 3 (control) | 100 |
| 4 | 88 |
| 5 | 97 |

Example 6

Preparation of PBD-PS Nanoparticles

Figure 3:
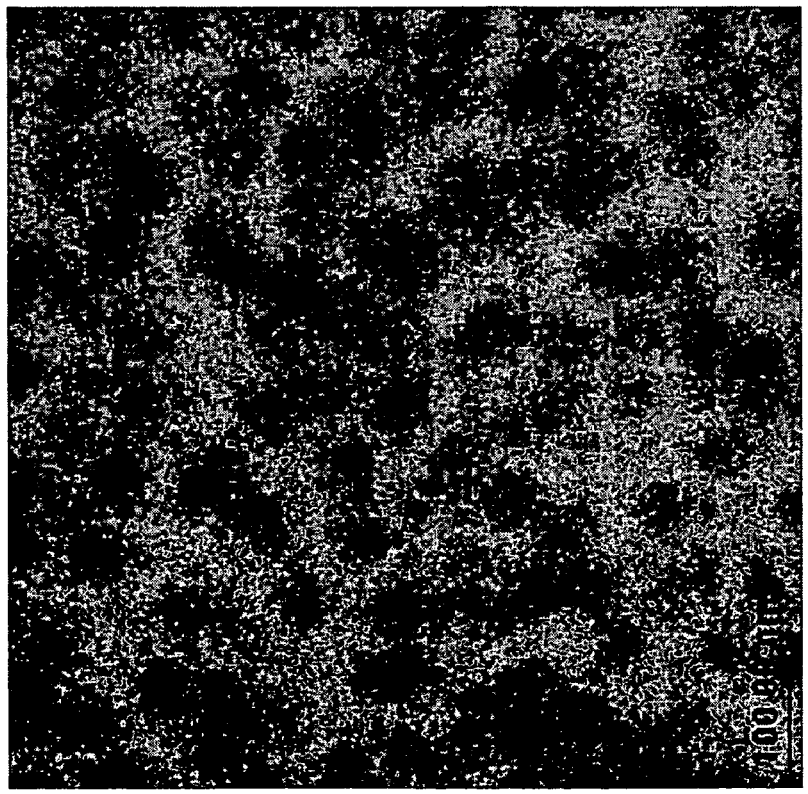
FIG. 3 is a TEM photograph of polymer nanoparticles formed in accordance with EXAMPLE 6.

A 7.5 L polymerization reactor was used for the preparation. The reactor was first charged with 517 g of hexane, followed by 1.0 kg butadiene/hexane blend (22.0 wt % of butadiene). The reactor was then heated to 57° C. After the temperature stabilized, the reactor was first charged with 2.5 mL of 1.6 M OOPS. The polymerization was initiated with 5.0 mL of a 1.68 M solution of butyl lithium in hexane. The batch temperature was maintained at 57° C. for the duration of the polymerization. After 2 hours (when the reaction was finished), the reactor was charged with 680 g of styrene/ hexane blend (33 wt % of styrene). After additional two-hour reaction, the reactor was charged with 1.8 kg of Hexane. After another additional 20 minutes, the reactor was charged with 50 mL of divinyl benzene. The temperature was maintained at 57° C. for two-hours, and a small amount of the product was taken for GPC analysis. The GPC analysis of the product showed that the micelle polymer had a number average molecular weight of 1,027,000. The polydispersity of the molecular weight was 1.11. The conversion of the reaction is about 100%. The NMR analysis showed that the product contains 50% of butadiene and 50% of styrene. The polybutadiene contains 22% cis, 18% trans and 60% vinyl structures. The product was dropped into isopropanol, precipitated, and drum dried. TEM analysis (FIG. 3) showed nano-sized particles.

Example 7

Preparation of Maleated Particle Polymers

Figure 4:
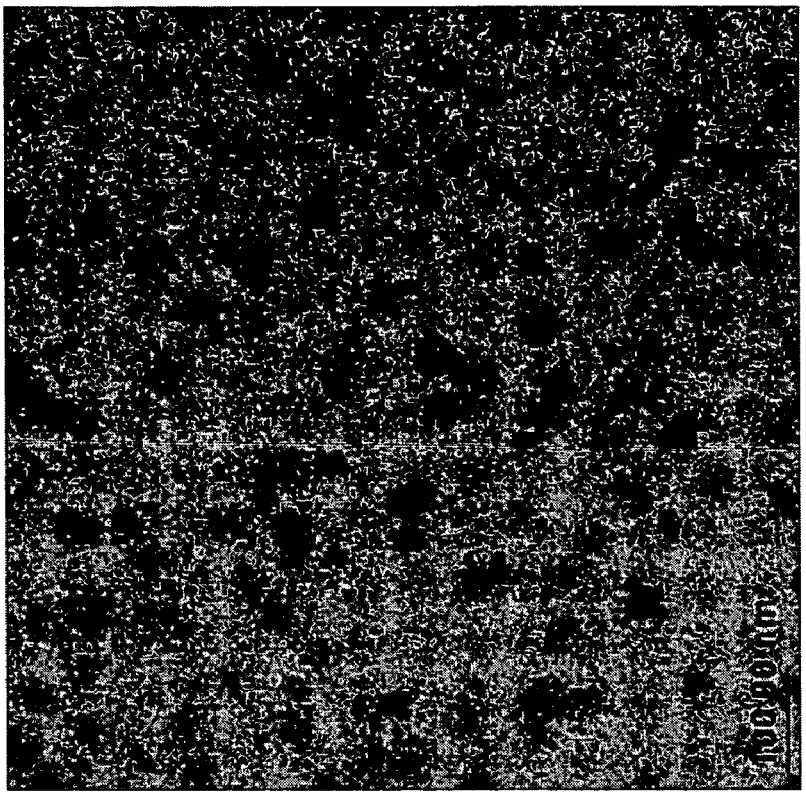
FIG. 4 is a TEM photograph of maleated polymer nanoparticles formed in accordance with EXAMPLE 7.

A 2000 mL three-neck round-bottom flask was used for the preparation. The middle neck was connected with a mechanical string motor. The left neck was used to charge various materials. The right neck was open for $N_2$ purging and thermometer placing. To the flask, 300 mL of DTDP oil (C. P. Hall) and 60 g of maleic anhydride (Aldrich) were charged. The flask was placed into a silicon oil bath and heated to 170° C. After temperature was stabilized, 500 mL of the hexane solution containing 10% of the product from Example 6 was added in droplet fashion into the flask. The charging speed was very slow and the process took about 2 hrs. After charging, the flask was maintained at 180° C. for half hour. The product was dropped into toluene and precipitated via addition of isopropenol. The product was washed five times with isopropenol. TEM analysis (FIG. 4) showed nano-sized particles. $^{13}C$ NMR analysis shows that the BR shell of particles contains about 2.8 wt % covalently bonded maleic anhydride. The product was insoluble in hexane.

Example 8

Preparation of Copper Ion-Polymer Particle Composite

Three 40 mL bottles were charged according to the following descriptions. Those bottles were then identified as bottle A, B, and C, respectively. The material inside those bottles was named accordingly as material A, B, and C.

A) 0.5 g of the products from example 7 was added into 15 g THF solvent. After vigorous stirring for half hour, the maleated particles were dissolved. The solution was completely transparent.

B) 0.5 g of the products from example 7 was added into 15 g toluene solvent. After vigorous stirring for half hour, the maleated particles were dissolved. The solution was completely transparent.

C) 0.5 g of $CuAc_2$ was added into a 15 g of THF solvent. After vigorous stirring for half hour, the $CuAc_2$ was dissolved. The solution was transparent to light.

The bottle B was then charged with 1.5 mL of solution from bottle C. The resulting solution was placed in a vacuum oven at 50° C. Further drying of the product under vacuum yielded a polymer micelle-Cu complex film. The film is dark blue, but transparent to light. In addition, the resulting film is insoluble in toluene, indicating that a new polymer complex was formed.

Example 9

Preparation of $Cu_2$S-Polymer Particle Composite

A bottle was charged with 1.5 mL of solution from bottle C. The resulting solution was dark blue color. $H_2S$ gas was bubbled through the solution to fully convert the Cu ions to CuS. The solution was purged with $N_2$ to remove excess $H_2S$. The resulting solution was dark colored, with no evidence of macroscopic precipitation of CuS from the solution. This indicated the CuS particles formed are nano-scaled. The resulting solution was placed in a vacuum oven at 50° C. Further drying of the product under vacuum yielded a polymer micelle-CuS nanocomposite film. The materials was black, but transparent to light.

Example 10

Preparation of Azocarboxylated Particle Polymers

A 2000 mL three-neck round-bottom flask was used for the preparation. The middle neck was connected with a mechanical string motor. The left neck was used to charge various materials. The right neck was opened to $N_2$ purging and the thermometer placing. 200 mL of DTDP oil (from C. P. Hall) and 70 g of diisopropyl azocarboxylate (from Aldrich) were charged to the flask. The flask was placed into a silicon oil bath and heated to 90° C. After the temperature stabilized, 660 g of the toluene solution containing 10% of the product from Example 6 was added in droplet fashion into the flask. The charging speed was slow, over about 2 hrs. After charging, the flask was heated to 100° C. and held at that temperature for two hours. The flask was then heated to 110° C. and held at that temperature for another two hours. Finally, the flask was heated to between 120° C. and 125° C. and held at that temperature for three hours.

The product was dropped into hexane, and a light-yellow product precipitated from the hexane solution. The product was washed five times with hexane. GPC analysis of the product, using polystyrene/THF as the standard, showed that the polymer had a number average molecular weight ($M_n$) of 857,900. The polydispersity of the molecular weight was 1.09. $^{13}C$ NMR analysis C=O and styrene showed that the product contained about 86.7 parts of chemically bonded diisopropyl azocarboxylate over one hundred parts (by weight) of the polymer of example 6. The product was soluble in methanol, ethanol, isopropanol, THF, chloroform, and toluene, but not soluble in hexane and cyclohexane.

Preparation of Nano-Sized Copper Sulfide (Cus) Particles

Three 40 mL bottles were charged according to the following descriptions. The bottles were then named as bottle D, E, and F respectfully. The material inside those bottles was named accordingly as material D, E, and F.

D) 0.5 g of the products from example 10 was added into 15 g toluene solvent. After vigorous stirring for half hour, the azocarboxylated particles were dissolved resulting in a transparent solution.

E) 0.5 g of $CuAc_2$ (from Aldrich) was added into a 15 g of THF solvent. After vigorous stirring for half hour, the $CuAc_2$ was dissolved resulting in a transparent to light solution.

F) 15 g pure toluene.

Example 11

Bottle D was charged with 1.5 mL of solution from bottle E. The resulting solution was dark blue color. $H_2S$ gas (Aldrich) was bubbled through the solution to fully convert the Cu ions to CuS. The solution was purged with $N_2$ to remove excess $H_2S$. The resulting solution is dark colored, with no macroscopic precipitation of CuS from the solution for a period of one month, indicating formation of nanoscale CuS particles complexed to the nanoparticles of Example 10. The resulting solution was placed in a vacuum oven at 50° C. Further drying of the product under vacuum yielded a polymer micelle-CuS nanocomposite film. The film was black, but transparent to light.

Example 12

Bottle F was then charged with 1.5 mL of solution from bottle E. The resulting solution was dark blue color. $H_2S$ gas was then bubbled through the solution to fully convert the Cu ions to CuS. The solution was purged with $N_2$ to remove excess $H_2S$. The resulting solution showed macroscopic precipitation of CuS from the solution immediately during the process.

Example 13

Figure 6:
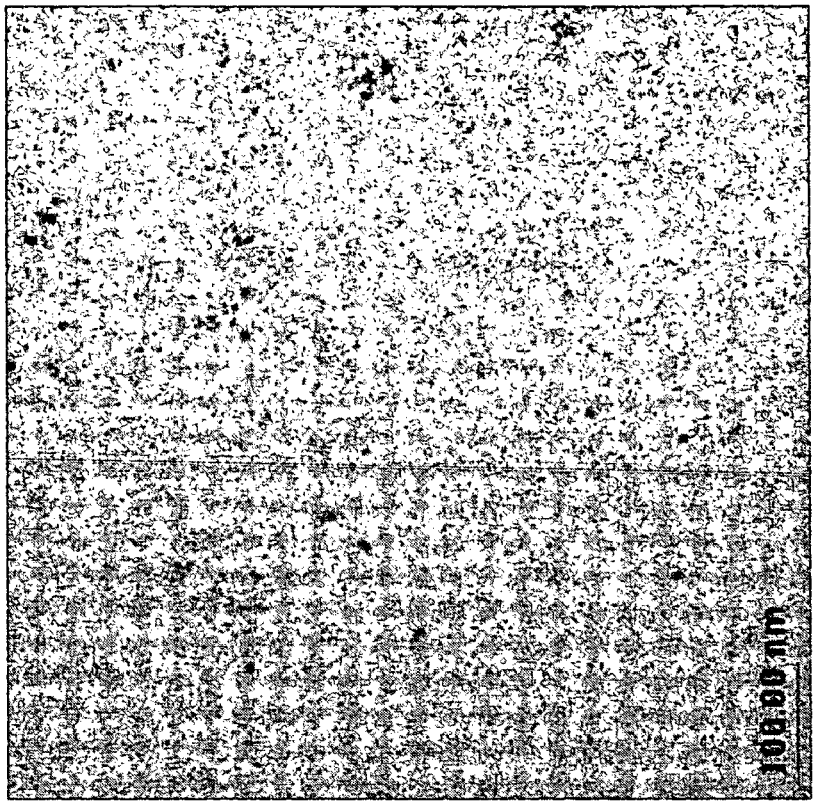
FIG. 6 is a TEM photograph of metal nanocomposites formed in accordance with EXAMPLE 13.
Figure 5:
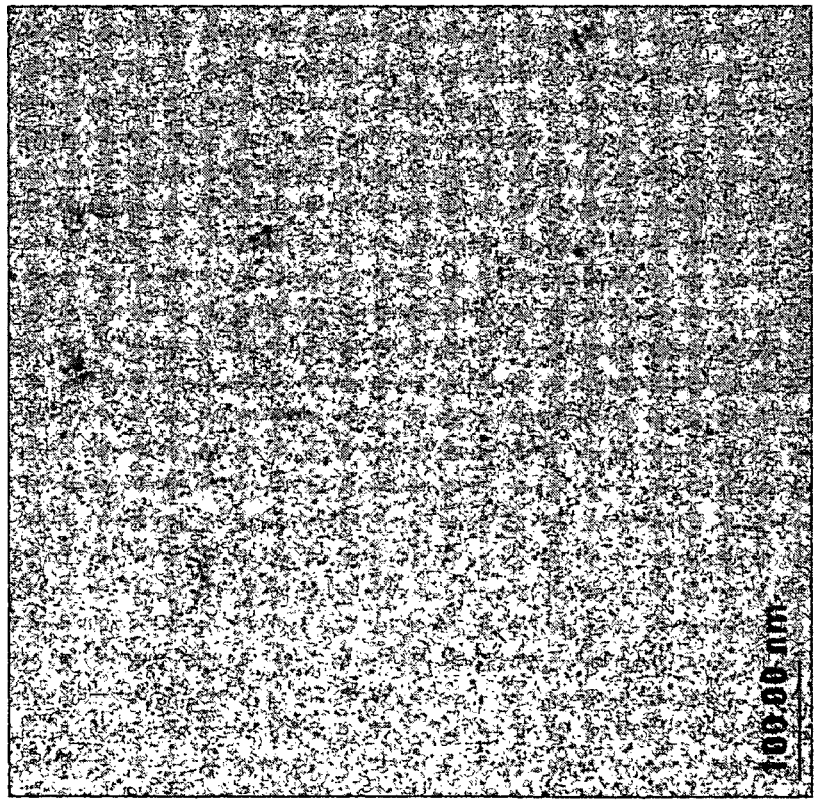
FIG. 5 is a TEM photograph of metallized polymer nanoparticles formed in accordance with EXAMPLE 13.

The transmission electron microscopy (TEM) analysis was taken on the solution in bottle D after the $H_2S$ treatment. The solution was further diluted with the toluene solvent to about $10^{-5}$ wt %. A drop of the diluted solution was then coated on a graphed copper micro-grid. After the solvent was evaporized, the screen was examined by TEM. The results showed that the polymer synthesized is a particle-like material and the average particle size was about 40 nm (FIG. 5). The CuS nano particles existed inside of each polymer particle and the average particle size of CuS crystals was 5 to 10 nm (FIG. 6). It is noted that the two pictures were taken at the same position, but the focus depths were different.

Preparation of Azocarboxylated Particle Polymers

Example 14. A 2000 mL three-neck round-bottom flask was used for the preparation. 740 g of the toluene solution containing 10% of the product from Example 6 and 100 g of diisopropyl azocarboxylate (from Aldrich) were added to the flask together. The flask was purged with $N_2$ for 0.5 hours. The flask was then heated to 115° C. and held at that temperature for seven hours. The product was dropped into hexane, and a light-yellow product was precipitated. The product was washed five times with hexane. GPC analysis of the product, using polystyrene/THF as the standard, showed that the polymer had a $M_n$ of 858,200. The polydispersity of the nanoparticles was 1.10 $^{13}$C NMR analysis showed the product contained about 121 parts of covalently bonded diisopropyl azocarboxylate over one hundred parts (by weight) of the polymers of Example 6. The product was soluble in methanol, ethanol, isopropanol, THF, chloroform, and toluene, but was insoluble in hexane and cyclohexane.

Preparation of Nano-Sized Cadmium Sulfide (Cds) Particles

Three 40 mL bottles were charged according to the following description. The bottles were then named as bottle G, H, and I, respectively. The material inside those bottles was named accordingly as material G, H, and I.

G) 0.5 g of the products from example 14 was added to 15 g toluene solvent. After vigorous stirring for half hour, the azocarboxylated particles were dissolved, and the solution was completely transparent.

H) 0.5 g of CdAc (Aldrich) was added to 15 g of MeOH solvent. After vigorous stirring for half hour, the CdAc was dissolved resulting in a transparent and colorless solution.

I) 15 g pure toluene.

Example 15

Bottle G was charged with 1.5 mL of solution from bottle H. $H_2S$ gas was bubbled through the solution to fully convert the Cd ions to CdS. The solution was purged with $N_2$ to remove excess of $H_2S$. The resulting solution was yellow, with no macroscopic precipitation of CdS from the solution for a period of one month, indicating formation of nanoscaled CdS particles complexed to the nanoparticles of Example H. The resulting solution was placed in a vacuum oven at 50° C. Further drying of the product under vacuum yielded to a polymer nanocomposite film. The film was yellow colored, but transparent to light.

Example 16

Bottle I was charged with 1.5 mL of solution from bottle H. $H_2S$ gas was bubbled through the solution to fully convert the Cd ions to CdS. The solution was purged with $N_2$ to remove excess $H_2S$. The resulting solution showed macroscopic precipitation of the yellow CdS from the solution immediately during the process.

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A nanoparticle comprising:
   a. an inner layer including alkenylbenzene monomer units,
   b. an outer layer including monomer units selected from the group consisting of conjugated diene, alkylene, alkenylbenzene, and mixtures thereof; and
   c. at least one functional group associated with the outer layer;
   wherein said nanoparticle has a mean average diameter of less than about 100 nm;
   wherein said functional group is selected from the group consisting of maleic anhydride, amine, azo, carboxylic acid, epoxide, amino, and mixtures thereof;
   provided that the functional group is not the product of an anionic initiator.

2. The nanoparticle of claim 1 wherein said nanoparticle is substantially monodisperse.

3. The nanoparticle of claim 1 wherein said conjugated dienes are selected from the group consisting of $C_4$-$C_8$ conjugated dienes and mixtures thereof.

4. The nanoparticle of claim 1 wherein said alkenylbenzene monomer units are selected from the group consisting of styrene, α-methyl styrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is not greater than 18, as well as any di- or tri-substituted aromatic hydrocarbons, and mixtures thereof.

5. The nanoparticle of claim 1 wherein said alkylene monomer units are formed by hydrogenating said conjugated diene monomer units.

6. The nanoparticle of claim 1 wherein said nanoparticles are crosslinked with a cross-linking agent.

7. The nanoparticle of claim 1 wherein said inner layer further includes conjugated diene monomer units.

8. The nanoparticle of claim 1, wherein the nanoparticle is formed by polymerizing alkenylbenzene monomer and conjugated diene monomer in a hydrocarbon solvent to form a diblock polymer;
   forming micelles of said diblock polymer;
   adding at least one crosslinking agent to the micelles to form crosslinked nanoparticles having an inner layer including alkenylbenzene monomer units and an outer layer including monomer units selected from the group consisting of alkenylbenzenes, conjugated dienes, and mixtures thereof; and
   after forming micelles of the diblock polymer or after forming crosslinked nanoparticles, then combining said micelles or nanoparticles with at least one functional group to form functionalized nanoparticles.

9. The nanoparticle of claim 8 wherein the polymerizing step is performed in the presence of a lithium initiator.

10. The nanoparticle of claim 8 wherein said conjugated diene monomer units are selected from the group consisting of $C_4$-$C_8$ conjugated dienes and mixtures thereof.

11. The nanoparticle of claim 8 wherein said alkenylbenzene monomer units are selected from the group consisting of styrene, α-methyl styrene, 1-vinyl naphthalene, 2-vinyl naphthalene, 1-a-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is not greater than 18, as well as any di- or tri-substituted aromatic hydrocarbons, and mixtures thereof.

12. The nanoparticle of claim 8 wherein said functional group is selected from the group consisting of maleic anhydride, azo, epoxide and mixtures thereof.

13. The process of claim 8 wherein the nanoparticle is functionalized before it is crosslinked.

14. A nanoparticle comprising:
   a. an inner layer including alkenylbenzene monomer units,
   b. an outer layer including monomer units selected from the group consisting of conjugated diene, alkylene, alkenylbenzene, and mixtures thereof; and
   c. at least one functional group associated with the outer layer;
   wherein said nanoparticle has a mean average diameter of less than about 100 nm;
   wherein said alkylene monomer units are formed by hydrogenating said conjugated diene monomer units;
   wherein functional groups are located throughout the outer layer of the nanoparticle.

15. The nanoparticle of claim 14 wherein said functional group is complexed with a metal.

16. The nanoparticle of claim 1 wherein said functional group is complexed with a metal.

17. The nanoparticle of claim 1, wherein said functional group is selected from the group consisting of maleic anhydride, azo, epoxide, and mixtures thereof.

18. A nanoparticle comprising:
   a. a cross-linked inner layer including alkenylbenzene monomer units,
   b. an outer layer including monomer units selected from the group consisting of conjugated diene, alkylene, alkenylbenzene, and mixtures thereof; and
   c. at least one functional group associated with the outer layer;
   wherein said functional group is polar;
   wherein functional groups are located throughout the outer layer of the nanoparticle.

19. The nanoparticle of claim 18 wherein said functional group is selected from the group consisting of maleic anhydride, azo, epoxide, and mixtures thereof.

20. The nanoparticle of claim 18 wherein said functional group is complexed with a metal.

21. The nanoparticle of claim 18 wherein the functional group is only associated with the outer layer after micelle formation or only after the inner layer of the nanoparticle is crosslinked.

22. The nanoparticle of claim 20 wherein the metal group is selected from the group consisting of: Cu, Ti, Fe, Cd, Ni, Pd, and mixtures thereof.

23. The nanoparticle of claim 14 wherein the functional group is associated with the outer layer only after micelle formation.

24. The nanoparticle of claim 18 provided that the functional group is not the product of an anionic initiator.

25. The nanoparticle of claim 1 wherein functional groups are located throughout the outer layer of the nanoparticle.

* * * * *